United States Patent [19]
Scobie et al.

[11] Patent Number: 4,651,763
[45] Date of Patent: Mar. 24, 1987

[54] FIRE-SAFE VENTILATION VALVE

[75] Inventors: William B. Scobie; Michael L. Wagberg, both of Houston, Tex.

[73] Assignee: Keystone International, Inc., Houston, Tex.

[21] Appl. No.: 836,540

[22] Filed: Mar. 5, 1986

[51] Int. Cl.⁴ .............................................. F17D 1/16
[52] U.S. Cl. ........................................ 137/13; 137/67; 137/74; 251/308; 251/317
[58] Field of Search ............... 137/67, 72, 74, 75, 137/63; 251/306, 316, 317, 308

[56] References Cited
U.S. PATENT DOCUMENTS
3,666,234 5/1972 Scavamucci ................... 251/306

FOREIGN PATENT DOCUMENTS
2710104 9/1977 Fed. Rep. of Germany ...... 251/308
32861 12/1966 Japan ................................... 251/306

Primary Examiner—Harold W. Weakley
Attorney, Agent, or Firm—Browning, Bushman, Zamecki & Anderson

[57] ABSTRACT

A means and method for assuring a tight sealing closure of a valve in a high temperature condition, such as fire, is provided by an expendable link on the downstream side of the valve stem and an intumescent material and piston on the upstream side of the valve stem so that, at an elevated temperature condition, the expendable link gives way to create a tolerance allowing the piston driven by the expanding intumescent material to shift the valve closure element in the direction of the valve seat to accommodate for any deterioration of the valve seal.

16 Claims, 6 Drawing Figures

U.S. Patent  Mar. 24, 1987  Sheet 1 of 3  4,651,763 ns in which:
FIRE-SAFE VENTILATION VALVE

BACKGROUND OF THE INVENTION

1. Field of the Invention

The present invention relates to a valve and more particularly to a means and method for assuring tight sealed closure of the valve in the event of fire and failure of the normal sealing means.

2. Description of the Prior Art

Valves employing pivotal closure elements, such as butterfly valves, are widely used throughout industry for fluid handling and control and in particular in ventilation systems. The butterfly valves generally have a resilient sealing means which engages a rigid metal portion of the valve to form a seal when the valve closure member is in the closed position. The seal is at least partially due to the deflection or resiliency of the sealing means, which is carried by either the valve disk or the valve body. A problem would arise if the valve or the fluent material passing therethrough is suddenly elevated to a high temperature, such as in the case of fire, when it is necessary to have such valves shut with assured effective sealing in order to prevent further combustion and/or discharge of the products of combustion.

While there are many known mechanisms and methods for rapidly shutting valves in the event of fire, merely shutting the valve will not necessarily obviate further problems since the elevated temperature of the fire may cause destruction of the sealing member, such as an O-ring, in the valve. Since the conventional valve does not normally form a complete metal-to-metal seal, the destruction of the sealing member would in fact leave sufficient space for the passage of either the fuel to sustain combustion or the products of combustion, either case being equally as undesirable.

SUMMARY OF THE INVENTION

The present invention overcomes the above-mentioned difficulties by providing a valve apparatus and method in which the valve disk will be shifted to a fully seated position in the event high temperatures which could cause destruction of the normal sealing means. The present invention, which is applicable to many styles of valves, is formed by a closure element assembly to be mounted in a valve housing which defines a flow passage therethrough and an annular seat in surrounding relationship to the flow passage. The closure element assembly includes a closure member having a circumferential profile adopted to mate with the valve seat in sealing relationship and with at least one hub secured to the closure member, each hub having a profiled through bore for receiving a valve stem therein. The valve stem is rotatably mounted in the valve body and extends along a diameter of the flow passage. The valve closure member is secured to the valve stem by a pair of oppositely directed set screws located generally on the upstream and downstream sides, respectively, of the closure element. The downstream set screw makes contact with the valve stem through an expendable link, while the upstream set screw makes contact with the valve stem through a piston whose position is determined by the state of a body of intumescent material.

In the event of fire or other high heat conditions, the expendable link loses its structural integrity allowing a certain amount of play between the valve stem and the downstream set screw. At the same time, the intumescent material is caused to expand to drive the piston against the valve stem from the upstream side thereby driving the closure element upstream into a tight sealing engagement with the valve seat obviating any voids left by the disintegration of the standard sealing means.

BRIEF DESCRIPTION OF THE DRAWINGS

The present invention will now be described by way of example with reference to the accompanying drawings in which.

DETAILED DESCRIPTION OF THE PREFERRED EMBODIMENT

The present invention has been shown as it would be utilized in a standard round butterfly control valve such as might be utilized in a ventilation system. It should be noted that the present invention can be used advantageously in butterfly valves of other shapes and configurations. It may be utilized in any valve where a closure element is moved with respect to a valve seat and the sealing is effected by means of an iterposed gasket or like material.

Figure 2:
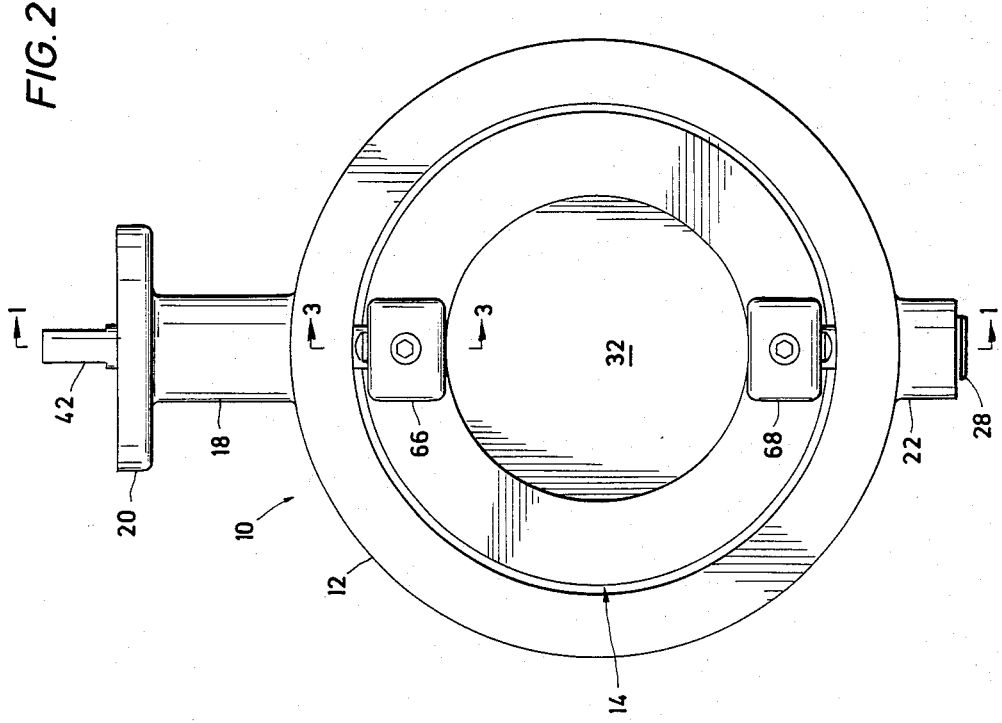
FIG. 2 is a plan view of a butterfly valve incorporating the present invention.
Figure 1:
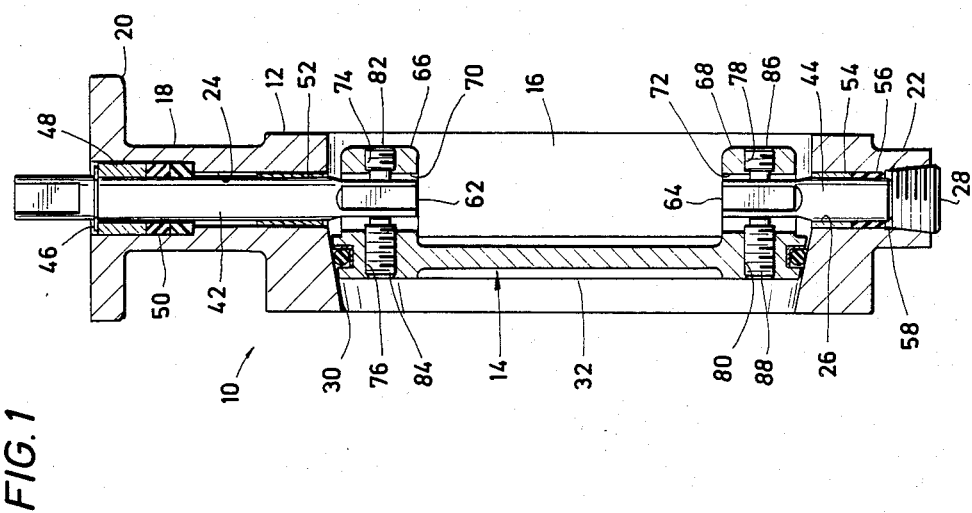
FIG. 1 is a section view taken along line 1—1 of FIG. 2.
Figure 3:
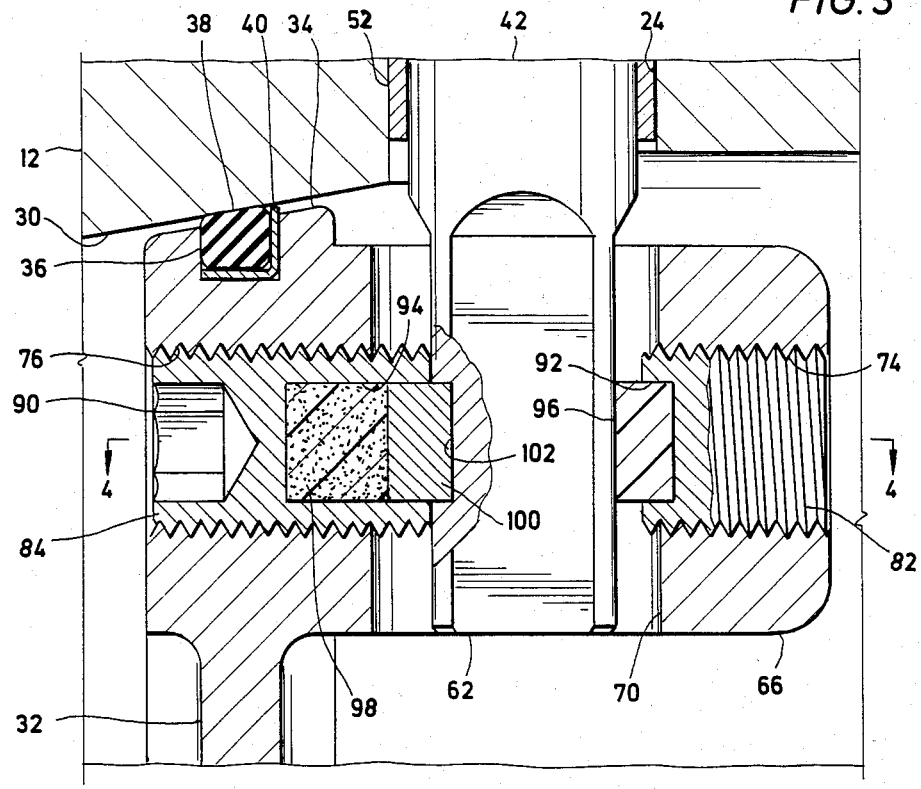
FIG. 3 is a detailed section taken alone line 3—3 of FIG. 2 and showing the valve in a normal state.
Figure 4:
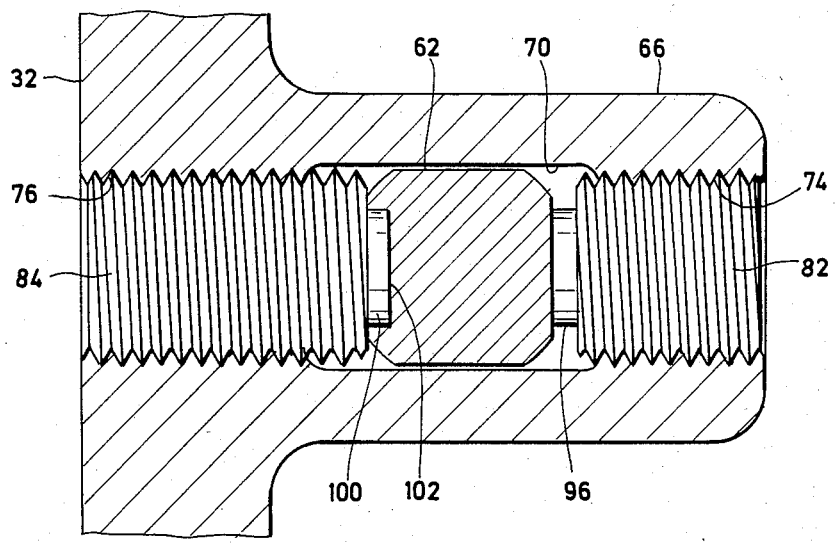
FIG. 4 is a section taken along line 4—4 of FIG. 3.

The valve 10 is formed by a valve body 12 and a closure assembly 14. The valve body is a rigid member defining a fluid flow passage 16 with a cylindrical neck 18 extending radially from one side of the body and topped by an enlarged mounting flange 20. Opposite the cylindrical neck 18 is a boss 22. A first bore 24 is formed in the neck 18 and a second bore 26 is formed in the boss 22, both bores being in axial alignment along a diameter of passage 16. The bore 26 is closed at its lower end by a plug 28. An annular seating surface 30 surrounds the flow passage 16. The valve closure assembly 14 is formed by a disk member 32 defining a sealing surface 34 profiled to be received in the annular seating surface 30. An annular groove 36 in the surface 34 receives an O-ring 38 and wiper seal 40 therein. The O-ring 38 is preferably made of conventional resilient materials, such as rubber or polymeric material, while the wiper seal 40 is a thin metallic member, such as stainless steel. An upper valve stem 42 is received in the first bore 24 of the body, while a lower stem 44 is received in the second bore 26. The valve stems 42 and 44 are axially aligned extending into the flow passage 16 along a diameter thereof. The upper valve stem 42 is mounted by a packing ring 46, a bushing 48, a packing 50 (which preferably is layered with fireproof materials) and a bearing 52, while the lower valve stem 44 is mounted by a bearing 54, a packing 56 (also including fireproof material) and a thrust washer 58. The upper end of the upper valve stem 42 extends beyond the flange 20 and is preferably profiled to receive thereon a valve actuation member (not shown), such as a turning wheel or a linkage. The inner ends 62, 64 of valve stems 42, 44, respectively, are preferably profiled to a polygonal geometric section (as best seen in FIG. 4) for reasons which will be explained below. As an alternative, these inner ends could be profiled to have a roughened, for example, knurled, high friction or textured surface (not shown).

The disk member 32 is provided with at least one hub 66, 68 atached to disk member 32 on opposite edges of one side thereof (normally the downstream side as shown) in alignment with the respective upper valve stem 42 and lower valve stem 44. Each hub 66, 68 is provided with a through bore 70, 72 which is preferably profiled to receive therein the profiled ends 62, 64 of the upper and lower valve stems 42, 44, respectively. Each bore 70, 72 is intersected by at least two generally opposing threaded passages 74, 76, 78, 80. A threaded member 82, 84, 86, 88 is received in each respective passage with each threaded member having a profiled driving bore 90, counterbore 92, 94 with an expendable link 96 received in the counterbore 92 and a body of intumescent material 98 and piston 100 received in the counterbores 94. Preferably, the valve stem 42, 44 is provided with a counterbore 102 which receives a portion of piston 100 therein.

The term "intumescent material" refers to a material or substance which will enlarge, swell, expand or extrude under the influence of heat to apply force between the blind end of counterbore 94 and the respective piston 100 causing the valve element to be shifted, to the left in the drawings. Such intumescent material are comprised of various composites employing materials such as ceramic fibers, asbestos, metallic fibers, animal fibers, vermiculite and other mineral substances, neoprene rubber and other synthetic materials or polymers and expanding granules as well as other ingredients which can be made flexible and may expand up to ten times their original volume when exposed to high temperatures, e.g. above 250° C. A typical example of such intumescent materials are a series of hot reactive materials known as Interam and marketed by 3M.

The expendable link could be selected from any of a wide variety of materials which within normal temperature ranges is a solid and moldable material capable of withstanding compressible forces without excessive distortion or flow. Such an expendable link could be made of alloys of bismuth, lead and tin and sometimes cadmium or mercury. Such materials are widely known and used in items such as fire extinguishers. It is intended that the term "expendable link" be considered sufficiently generic to cover non-metallic equivalents, such as polymeric materials, and the link would lose its structural integrity at, above, or below the temperature at which the seal 38 loses its structural integrity. The expendable link could be a fusible or vaporizable material.

Figure 6:
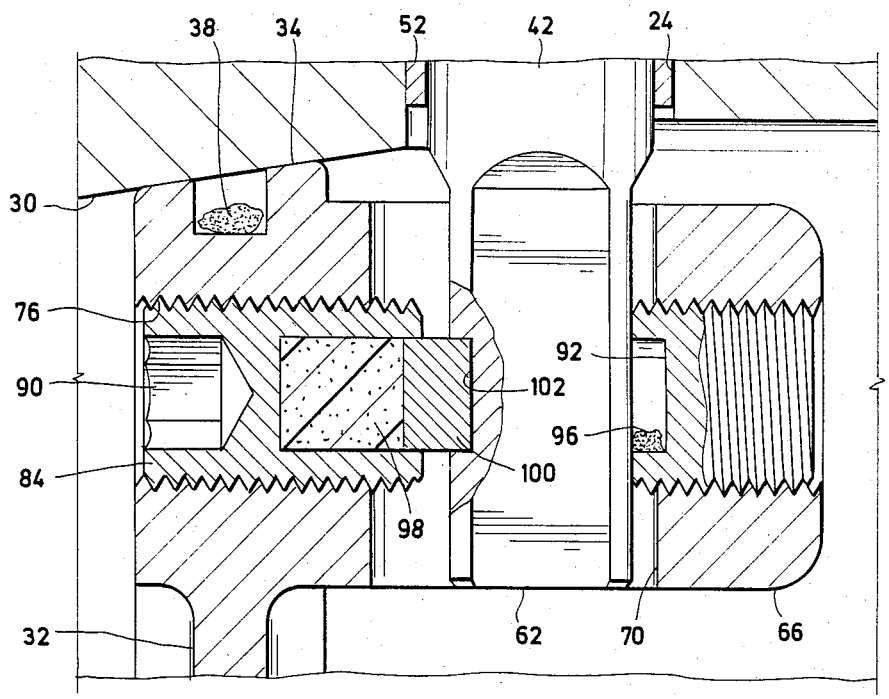
FIG. 6 is a detailed section similar to FIG. 4 showing an alternate embodiment after having been subjected to fire and/or high heat.

In the normal scenario for the present valve, in the event of a high temperature situation such as a fire which would cause degradation of the O-ring 38, the expendable link 96 would also degrade and the intumescent material 98 expanded to cause a relative movement of the disk 32 to the left in the figures. In one embodiment, the thin section of stainless steel 40 in the groove 36 will yield and conform to the seating surface 30 so that any gap between the surface 30 will be closed as the disk member moves. In another embodiment without the stainless steel seal 40, the valve disk 32 will be moved sufficiently toward the valve seat 30 that a tight surface-to-surface seal will be formed, as shown in FIG. 6.

Figure 5:
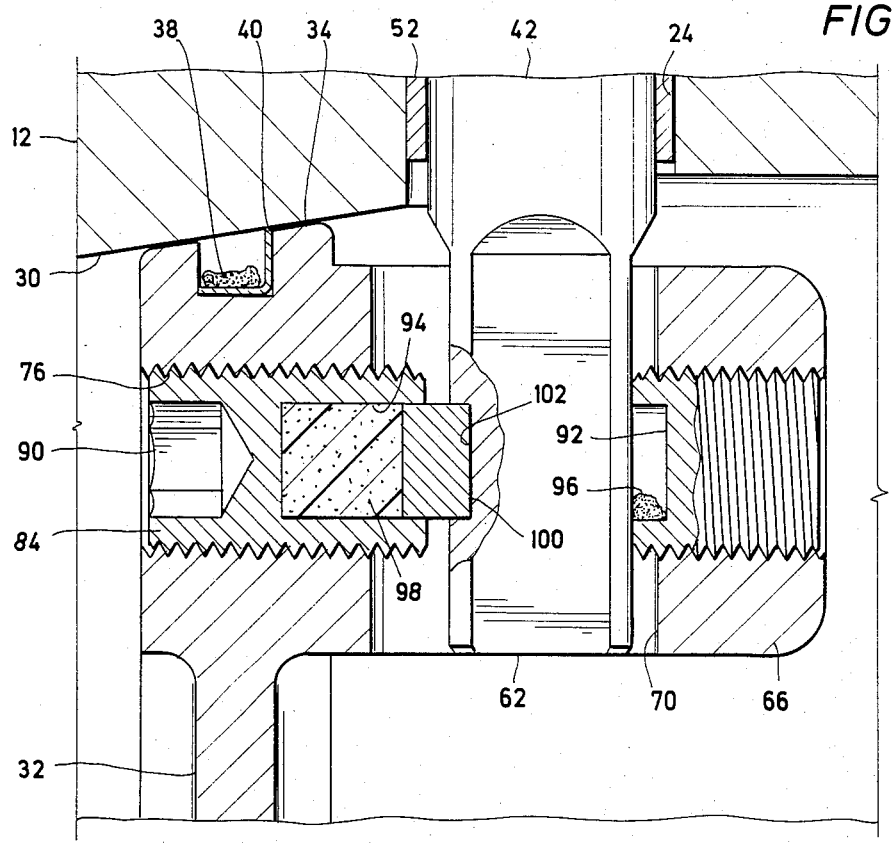
FIG. 5 is a detailed section similar to FIG. 3 showing the valve after having been subjected to fire and/or high heat.

During a fire or high heat situation, the expendable link 96 disintegrates and the intumescent material 98 expands pushing the disk 32 toward the seat surface 30. The amount of movement is controlled by the set screws 82, 86 with the expendable link so that a metal-to-metal seal is created either by seal 40 (FIG. 5) or by disk 32 (FIG. 6). The fire would be prevented from expanding along the valve stems 42, 44 by the fireproof packings 50, 56. It should be noted that both the O-ring 38 and expendable link 96 are shown in FIGS. 5 and 6 after having lost structural integrity.

The present invention may be subject to many modifications and changes without departing from the spirit or essential characteristics thereof. The above-described embodiment should therefore be deemed to be illustrative and not restrictive as to the scope of the present invention which is defined in the appended claims.

What is claimed is:

1. A valve comprising:
    a valve body defining a flow passage therethrough and an annular seat in surrounding relationship to said flow passage;
    a closure assembly mounted within said valve body for movement between open and closed positions to control the flow of fluid through said passage, said assembly comprising at least one valve stem rotatably mounted in said housing and extending into said passage along a diameter thereof, a closure element having a circumferential profile matable with said annular seat, and means for mounting said closure element on said at least one valve stem including at least one hub fixed to said closure element and defining a bore receiving said at least one valve stem therein, at least two threaded passages intersecting said bore in general opposition from upstream and downstream directions, a threaded member threadedly received in each said passage, each said threaded member having a counterbore, an expendable link in said bore of said downstream threaded member and a body of intumescent material and a piston in the counterbore of the other of said threaded members whereby degradation of said fusable link and expansion of said intumescent material causes a relative shifting of said closure element with respect to said valve seat to assure full sealing therebetween.

2. A valve according to claim 1 further comprising an annular recess about the circumference of said closure element, sealing means disposed in said recess, the materials for said sealing means, intumescent material and expendable link being so selected that the expendable link and intumescent material respond to elevated temperatures immediately prior to the degradation of the sealing means to an unusable condition.

3. A valve according to claim 1 wherein said closure element includes a circumferential recess, a first sealing member of a degradable material disposed in said recess and a second sealing member of thin metal disposed in said recess whereby shifting of said closure member brings the thin metal member into a wiping sealing engagement with the valve seat.

4. A valve according to claim 1 wherein said intumescent material is such that it will enlarge, swell, expand or extrude under the influence of heat.

5. A valve according to claim 1 wherein said expendable link will lose structural integrity under the influence of heat.

6. A valve according to claim 5 wherein said expendable link is fusible.

7. A valve according to claim 5 wherein said expendable link is vaporizable.

8. Means to assure a fire-sealing closure of a valve closure element in a fluid flow passage of a valve, said valve closure element being mounted on at least one valve stem for pivotal mounting in said housing between open and closed positions to control fluid flow through said passage, said means comprising an expendable link between said valve stem and a downstream portion of said valve closure element and an intumescent material and piston between said closure element and valve stem on an upstream portion of said valve closure element whereby an elevated temperature will cause degradation of the expendable link and expansion of the intumescent material thereby creating movement of the closure element in an upstream direction to assure tight sealing regardless of the condition of the valve seal.

9. Means according to claim 8 further comprising: a piston between said valve stem and said intumescent material.

10. Means according to claim 8 wherein said intumescent material will enlarge, swell, expand or extrude under the influence of heat.

11. Means according to claim 8 wherein said expendable link will lose structural integrity under the influence of heat.

12. Means according to claim 8 further comprising means to adjust the relative positions of said expendable link and said intumescent material and said piston with respect to said valve stem.

13. Means according to claim 8 wherein said valve stem is profiled to receive at least a portion of said piston therein.

14. Means according to claim 8 wherein said closure element is driven into a surface-to-surface metal seal with a seat of said valve.

15. Means according to claim 8 wherein said closure element further comprises a thin metal sealing means which is driven into wiping engagement with a seat of said valve.

16. A method for assuring fire-sealing closure of a valve closure element with respect to a valve seat, said seat being defined in an annular fluid passage in a valve body and said closure element being pivotally mounted on a valve stem rotatably mounted in said body and extending into said fluid passage coaxially from opposite sides thereof comprising the steps of:

providing an expendable link between said valve stem and the downstream side of said closure element and an intumescent material and piston between said valve stem and the upstream side of said closure element, whereby at elevated temperatures, said closure member will be shifted in the upstream direction with the loss of structural integrity of the expendable link and expansion of said intumescent material.

* * * * *